(12) United States Patent  (10) Patent No.: US 6,984,190 B2
Legner  (45) Date of Patent: Jan. 10, 2006

(54) POWER TRAIN FOR A MOBILE VEHICLE

(75) Inventor: Jürgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/756,937

(22) Filed: Jan. 14, 2004

(65) Prior Publication Data

US 2004/0157701 A1    Aug. 12, 2004

(30) Foreign Application Priority Data

Feb. 7, 2003  (DE) ............................... 103 04 918

(51) Int. Cl.
    *F16H 61/48*    (2006.01)
(52) U.S. Cl. ....................................................... 477/53
(58) Field of Classification Search .................. 477/53
    See application file for complete search history.

(56) References Cited

U.S. PATENT DOCUMENTS 3,789,943 A    2/1974  Kampert et al.
3,896,910 A    7/1975  Audiffred et al.
4,004,417 A    1/1977  Woody et al.
5,040,648 A    8/1991  Mitchell et al. ........... 192/3.58
5,674,155 A   10/1997  Otto et al. .................. 477/176
6,595,885 B1 * 7/2003  Lutgen ......................... 475/76
2005/0103595 A1  5/2005  Burkhart

FOREIGN PATENT DOCUMENTS

DE    43 28 182 A1   2/1994
DE    691 26 327 T2  1/1998
DE    102 01 838 A1  7/2003

* cited by examiner

*Primary Examiner*—Dirk Wright
(74) *Attorney, Agent, or Firm*—Davis & Bujold, P.L.L.C.

(57) ABSTRACT

A power train for construction machinery, preferably a wheel loader, has an internal combustion engine (1) which, via a primary clutch (2), drives a hydrodynamic torque converter (3) the output of which drives a reduction gear (4). The prime mover (1) communicates with a power take off (6) and drives a consumer (7). The prime mover (1) and the hydrodynamic torque converter are designed so that at the stall point and when the consumer (7) is not activated, the prime mover is operated close to its maximum torque. If the consumer (7) is additionally activated, the primary clutch (2) is actuated in opening direction until a defined rotational speed of the prime mover is retained.

10 Claims, 1 Drawing Sheet

POWER TRAIN FOR A MOBILE VEHICLE

This application claims priority from German Application Serial No. 204 04 918.5 filed Feb. 7, 2003.

FIELD OF THE INVENTION

The invention relates to a power train for a mobile vehicle.

BACKGROUND OF THE INVENTION

The power train, according to the preamble, has an internal combustion engine which, on one side, drives the driving wheels via a hydrodynamic converter and a rear-mounted shiftable reduction gear and, on the other, is connected with an activatable consumer. This design is often used in construction machinery, such as wheel loaders, where a hydrostatic pump in operative connection with the prime mover stands as consumer, supplying with pressure medium the steering system or the lifting gear, the same as the blade for the actuation thereof. When using said power train for this type of vehicle, the performance of the power take off is as important as the performance of the drive system in the design of the prime mover and of the hydrodynamic torque converter. The prime mover, combined with its torque converter, as a rule, has an abrupt torque build-up which can be, for example, of 35%, and the prime mover is designed with its torque converter so that in the stall point of the vehicle, when the consumer is not activated, the prime mover is operated at its rated rotational speed. Due to the abrupt torque build-up of the prime mover, the rotational speed of the prime mover drops when the consumer is fully activated on the power take off; the torque of the prime mover building up whereby a sudden stoppage of the prime mover is prevented. As result of this design, during the pure driving operation, the vehicle moves to an unfavorable efficiency range which leads to an increased fuel consumption.

DE 691 26 327 T2 discloses an electrohydraulic control device for a power train of a vehicle which, depending on a brake valve, controls a primary clutch located between the prime mover and the torque converter whereby more power of the prime mover is available during defined operating states of the working hydraulics.

The problem on which this invention is based is to provide a power train for a mobile vehicle having an internal combustion engine and a torque converter, the same as a power take off, and which stands out by low fuel consumption.

SUMMARY OF THE INVENTION

According to the invention, the power train for a mobile vehicle has an internal combustion engine connected via a primary clutch with a hydrodynamic torque converter which drives a reduction gear. The internal combustion engine with its torque converter is designed optimized on the drive system whereby the prime mover at the stall point of the vehicle, that is, when the vehicle is stationary and the prime mover is under full load, approximates it maximum torque, the consumer not being activated on the power take off at this stall point. The prime mover is thus operated in the drive system at clearly lower rotational speeds, which reduces the consumption of fuel. A prime mover having a small torque build-up of 15%, for example, is preferably used. At the stall point, the prime mover is preferably in the range of about 1700 rev./min. A converter with greater torque build-up is preferably used whereby a lesser converter slip results which, with added advantage, affects the consumption of fuel. In order to prevent that due to activation of the power take off, the prime mover is loaded above its maximum torque, which would result in stoppage of the prime mover; the primary clutch, depending on the operating state of the prime mover, is actuated in opening direction until the operation of the prime mover remains ensured. In this state of operation with slipping primary clutch, the resulting traction is weaker than when the primary clutch is closed. To achieve with slipping primary clutch the same tractive forces as with similar driving mechanisms without primary clutch, another ratio step could be shifted in the powershift transmission. Said additional gear step is used only when the consumer is under control.

In a further development, the primary clutch is actuated in opening direction, always while the consumer is activated, to the extent in which a defined rotational speed is ensured on the consumer. It is possible to connect an electronic control unit with the sensors which detect, for example, the operating state of the primary mover, the same as the operating state of the primary clutch and the operating state of the transmission and the same as the operating state of the consumer and in accordance with said signals, to control the primary clutch so that the prime mover can be reliably operated and the consumer have sufficient rotational speed available. When the power take off is not activated, the primary clutch preferably remains fully closed. It is possible here to use the position of the accelerator pedal proportionally as load signal for the prime mover. While an accelerator pedal is fully actuated, if a wheel loader, for example, moves into an accumulation of loose material, the driving speed decreases in proportion to the resistance until the vehicle stops. The prime mover is pressed almost to its maximum torque. If the lifting hydraulic system and thus the power take off are now actuated, the primary clutch is controlled in operating direction by the electronic control unit so as not to fall below a defined prime mover rotational speed. It is possible in this state that in the powershift transmission one other high reduction step is shifted in order that the traction remains similarly strong so that in similar driving mechanisms without primary clutch. The signal for activation of the power take off can result, for example, via sensors of the control lever or with sensors on the hydraulic pump of the power take off. In one further development, the rotational speed of the prime mover is controlled in proportion to the accelerator pedal position, it being possible to reduce the traction via a combined brake-inching pedal. It is possible to configure the brake-inching pedal so as to have at least two ranges where, in the first range of the actuation path, only the traction is reduced via the primary clutch and, in another second range of the actuation path, the service brake is controlled proportionally rising. At the same time, the primary clutch is increasingly released. The use of this additional function prevents, for example, a rolling back on a gradient.

The instant invention thus provides a power train for a mobile vehicle which stands out in small fuel consumption by the prime mover and the hydrodynamic converter is optimally designed on the drive system and by the primary clutch making an additional power reduction possible via a power take off.

BRIEF DESCRIPTION OF THE DRAWINGS

The invention will now be described, by way of example, with reference to the accompanying drawings in which.

DETAILED DESCRIPTION OF THE INVENTION

Figure 1:
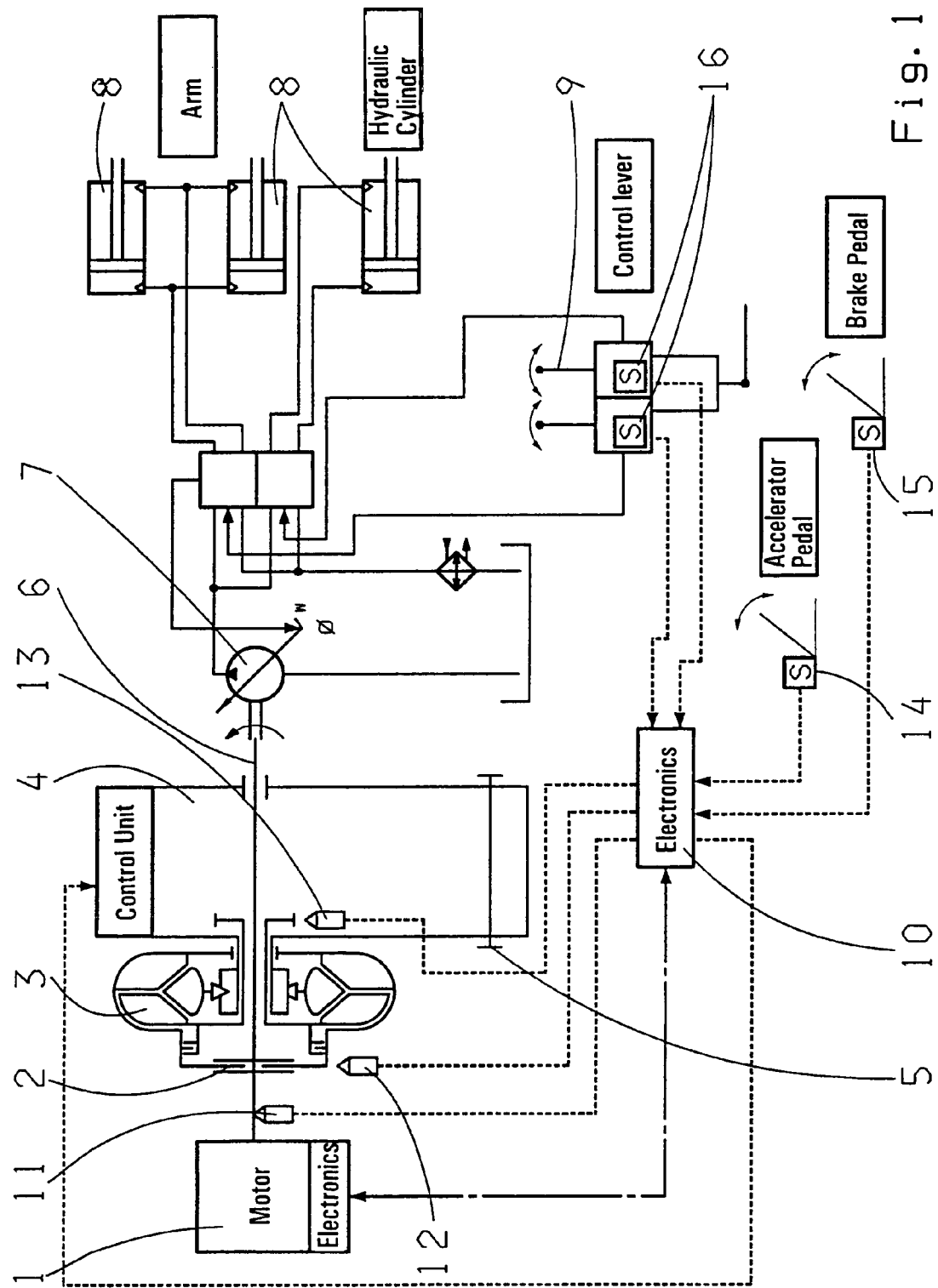
FIG. 1 shows a primary mover designed as a internal combustion engine.

The single FIGURE shows a primary mover 1 designed as an internal combustion engine and connected via a primary clutch 2 with a hydrodynamic converter 3. The output of the hydrodynamic converter is connected with an engageable reduction gear 4, an output 5 of which is connected with driving wheels (not shown) of the mobile vehicle. A consumer 7 is directly connected via a power take off 6 with the prime mover 1. The consumer 7 is designed as a gear wheel pump or adjustable hydraulic axial piston pump and supplies hydraulic cylinder 8 such as the lifting cylinders of a blade of a wheel loader. The hydraulic cylinder 8 can be activated via a control lever 9. An electronic control unit 10 detects the rotational speed of the prime mover 1 from a sensor 11, the operating state of the primary clutch 2 from a sensor 12, the output rotational speed of the hydrodynamic converter 3 from a sensor 13, the position of the accelerator pedal from a sensor 14, the position of the brake pedal from a sensor 15 and the position of the control lever 9 from sensor 16. It is possible to bring the hydrodynamic converter 3 to operative connection with a converter bridge clutch which opens or closes, starting from a defined operating state of the hydrodynamic converter 3. If the wheel loader, for example, is in transportation drive, the electronic control unit 10 detects via the sensor 16, that the hydraulic cylinders are not activated and keeps the primary clutch 2 closed. The prime mover 1 and the hydrodynamic converter 3 are hereby operated with an optimized range of efficiency, since the hydrodynamic converter 3 and the prime mover 1 are designed in the stall point so that, during a reduced rotational speed, the prime mover 1 is in the range of its maximum torque. If the lifting gear of the blades is actuated in a wheel loader, the electronic control unit 10 detects via the sensor 16 the actuation of the control lever 9 and the electronic control unit controls the primary clutch 2, according to the operating state of the prime mover 1, which it detects, via the sensor 11 and the sensor 14, in a manner such that either a defined rotational speed of the power take off 6 is maintained or the prime mover 1 does not drop below a defined rotational speed level. If the electronic control unit 10 detects, via the sensor 15, that the brake pedal is actuated, the primary clutch 2 is controlled by the electronic control unit 10 in opening direction. It is possible here in a first path range of the brake pedal to reduce only the traction via the primary clutch 2 and in another path range of the brake pedal increasingly to control in closing direction a service brake (not shown).

It is thus possible to control the power train sparing fuel.

REFERENCE NUMERALS

1 prime mover
2 primary clutch
3 hydrodynamic converter
4 reduction gear
5 output
6 power take off
7 consumer
8 hydraulic cylinder
9 control lever
10 electronic control unit
11 sensor
12 sensor
13 sensor
14 sensor
15 sensor
16 sensor

What is claimed is:

1. A power train for a mobile vehicle comprising:
   an internal combustion engine (1) which drives a reduction gear (4) via a hydrodynamic torque converter (3), and a primary clutch (2) being situated between said internal combustion engine (1) and said hydrodynamic torque converter (3); and
   at least one power take off (6) communicating with said internal combustion engine (1) for driving at least one consumer (7);
   wherein said torque converter (3) is designed so that when said internal combustion engine (1) is under full load and said consumer (7) is not activated and the vehicle is stationary, said internal combustion engine (1) is operated close to its maximum torque.

2. The power train according to claim 1, wherein when said consumer (7) is activated, said primary clutch (2) is actuated in an opening direction so that said internal combustion engine (1), under full load, does not drop below its maximum torque.

3. The power train according to claim 1, wherein when said consumer (7) is activated, said primary clutch (2) is actuated in an opening direction until said internal combustion engine (1) reaches a desired rotational speed.

4. The power train according to claim 1, wherein said power train facilitates torque build-up in said internal combustion engine (1).

5. The power train according to claim 1, wherein said torque converter minimizes slip to facilitates absorption of torque.

6. The power train according to claim 1, wherein when said consumer (7) is activated and a service brake is actuated, said primary clutch (2) is completely disengaged.

7. The power train according to claim 1, wherein said primary clutch (2) is actuated toward the opening direction when a service brake is actuated.

8. The power train according to claim 2, wherein in case of slippage of the primary clutch (2), a reduction of the reduction gear (4) is engaged.

9. A method for actuating a primary clutch (2) in a power train of a mobile vehicle having at least one internal combustion engine (1) which drives a reduction gear (4) via a hydrodynamic torque converter (3), the primary clutch (2) being situated between said internal combustion engine (1) and said hydrodynamic converter (3), and a power take off (6) communicating with said at least one internal combustion engine (1) and driving a consumer (7), the method comprising the steps of:
   designing said hydrodynamic converter (3) so that when said internal combustion engine (1) is a under full load, not activated by the consumer (7) and in a stationary vehicle, said internal combustion engine is operated close to a maximum torque at a stall point; and
   actuating said primary clutch (2) toward an opening direction, when said consumer (7) is actuated, so that said internal combustion engine (1) does not drop below a maximum torque.

10. A method for actuating a primary clutch (2) in a power train for a mobile vehicle having at least one internal combustion engine (1) which drives a reduction gear (4) via a hydrodynamic converter (3), said primary clutch (2) being located between said at least one internal combustion engine (1) and said hydrodynamic converter (3) and a power take off (6) communicating with said at least one internal combustion engine (1) and driving at least one consumer (7), designing said hydrodynamic converter (3) so that when said internal combustion engine (1) is a under full load, not activated by the at least one consumer (7) and in a stationary vehicle, said internal combustion engine is operated close to a maximum torque at a stall point; and adjusting said primary clutch (2), when said consumer (7) is actuated in the opening direction, until said power take off (6) assumes a predefined rotational speed.

* * * * *